(12) United States Patent
Iveland et al.

(10) Patent No.: US 7,274,675 B2
(45) Date of Patent: Sep. 25, 2007

(54) DYNAMIC DISTRIBUTION OF PARTICIPANTS IN A CENTRALIZED TELEPHONE CONFERENCE

(75) Inventors: Espen Iveland, Drammen (NO); Espen Skjæran, Oslo (NO); Knut Snorre Bach Corneliussen, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1075 days.

(21) Appl. No.: 10/194,960

(22) Filed: Jul. 12, 2002

(65) Prior Publication Data

US 2003/0026214 A1   Feb. 6, 2003

(30) Foreign Application Priority Data

Jul. 13, 2001   (NO)   ................... 20013497

(51) Int. Cl.
*H04L 12/16* (2006.01)
*H04L 12/64* (2006.01)

(52) U.S. Cl. .................. 370/260; 379/202.01; 455/416

(58) Field of Classification Search ................ 370/260; 379/202.01, 203.01, 158; 455/416; 348/211.12
See application file for complete search history.

(56) References Cited

U.S. PATENT DOCUMENTS

| 6,671,262 | B1 * | 12/2003 | Kung et al. ................. 370/260 |
| 6,775,247 | B1 * | 8/2004 | Shaffer et al. .............. 370/260 |
| 6,816,469 | B1 * | 11/2004 | Kung et al. ................. 370/260 |
| 6,839,356 | B2 * | 1/2005 | Barany et al. .............. 370/401 |
| 6,857,021 | B1 * | 2/2005 | Schuster et al. ............ 709/227 |
| 7,113,992 | B1 * | 9/2006 | Even .......................... 709/227 |
| 2002/0126701 | A1 * | 9/2002 | Requena ..................... 370/469 |
| 2002/0172341 | A1 * | 11/2002 | Wellner et al. ........ 379/202.01 |
| 2002/0194378 | A1 * | 12/2002 | Foti ........................... 709/246 |
| 2003/0014488 | A1 * | 1/2003 | Dalal et al. ................. 709/204 |
| 2003/0021400 | A1 * | 1/2003 | Grandgent et al. .... 379/202.01 |

* cited by examiner

*Primary Examiner*—Seema S. Rao
*Assistant Examiner*—Ahmed Elallam

(57) ABSTRACT

A method for distributing participants of a conference handled by a first conference unit in a packet switched network is disclosed. This is provided by, when a first condition is reached, locating a second conference unit satisfying a second condition, reserving conference call capacity in said second conference unit, transferring one or more of said participants from the first to the second conference unit and preferably entering said first conference unit as a participant in said second conference unit, wherein data streams of possible conference participants still attached to the first conference unit are mixed in the first conference unit and communicated as one data stream to the second conference unit.

The invention is particularly useful when applied to the SIP protocol in a 3GPP network.

6 Claims, 3 Drawing Sheets

2 Moving participants to new MRF

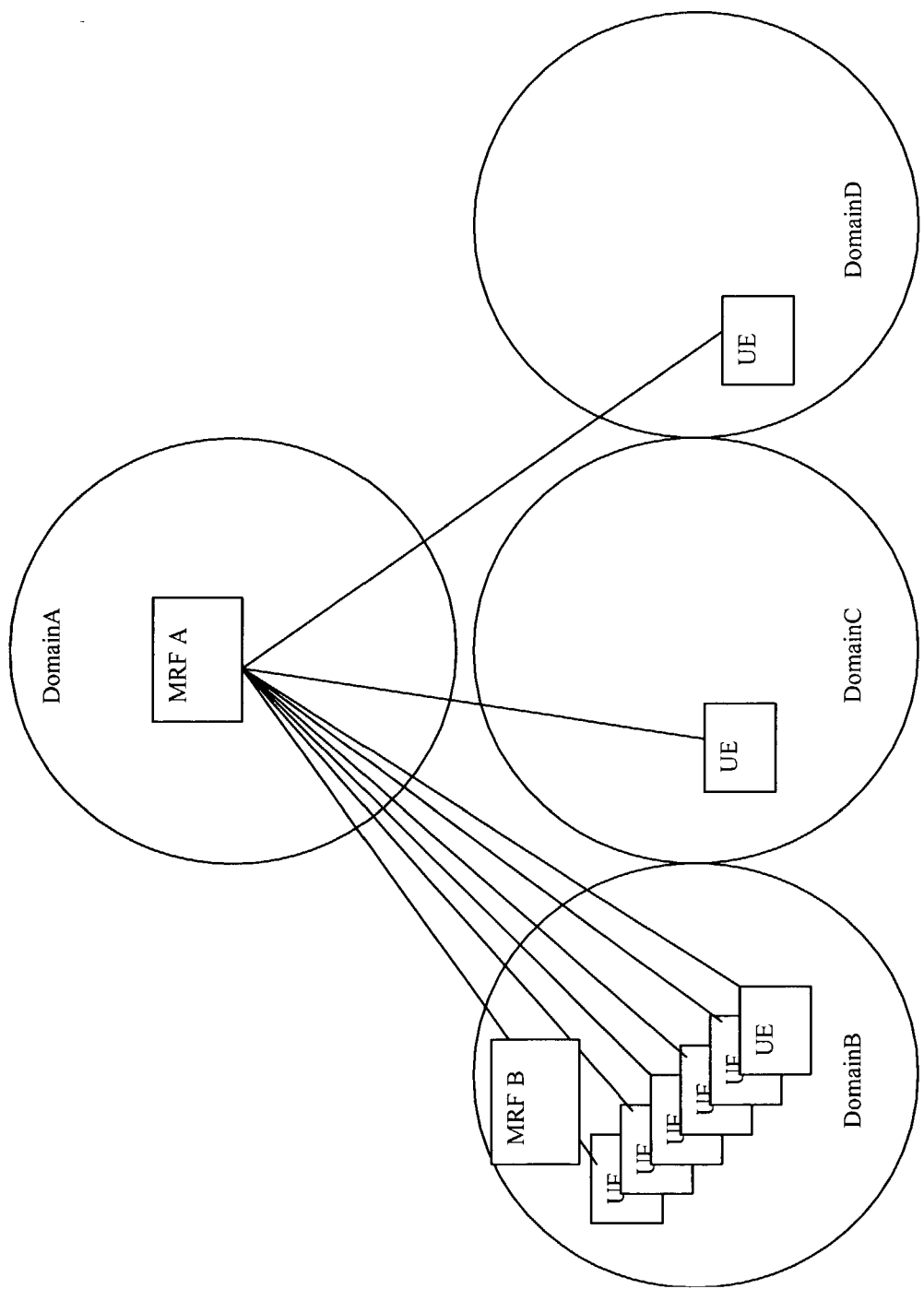
Fig. 1 Situation before involving another MRF

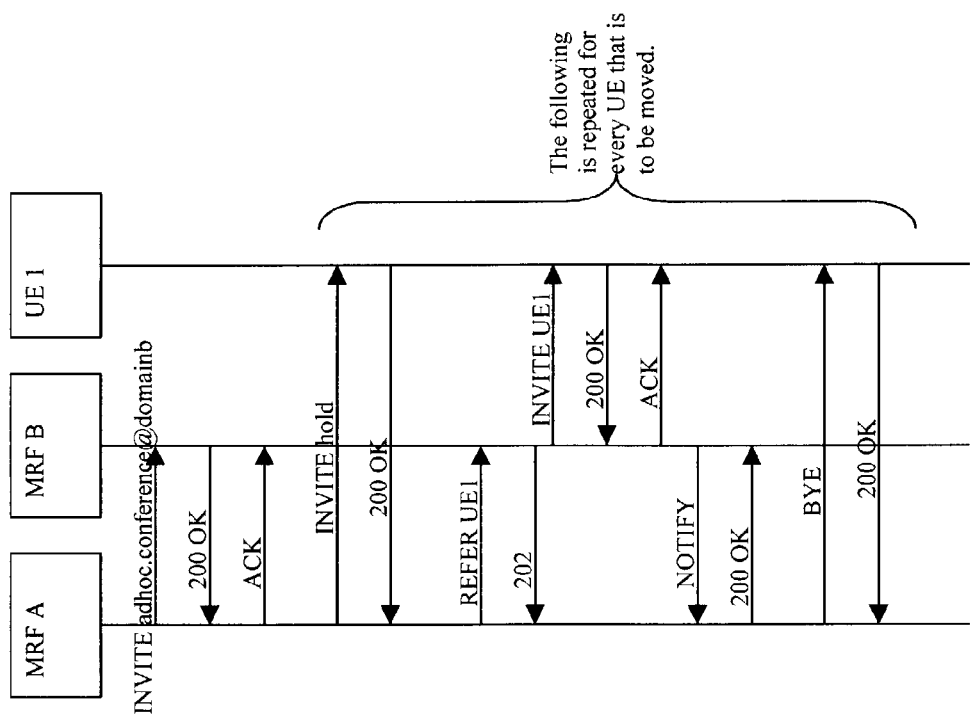
Fig. 2 Moving participants to new MRF

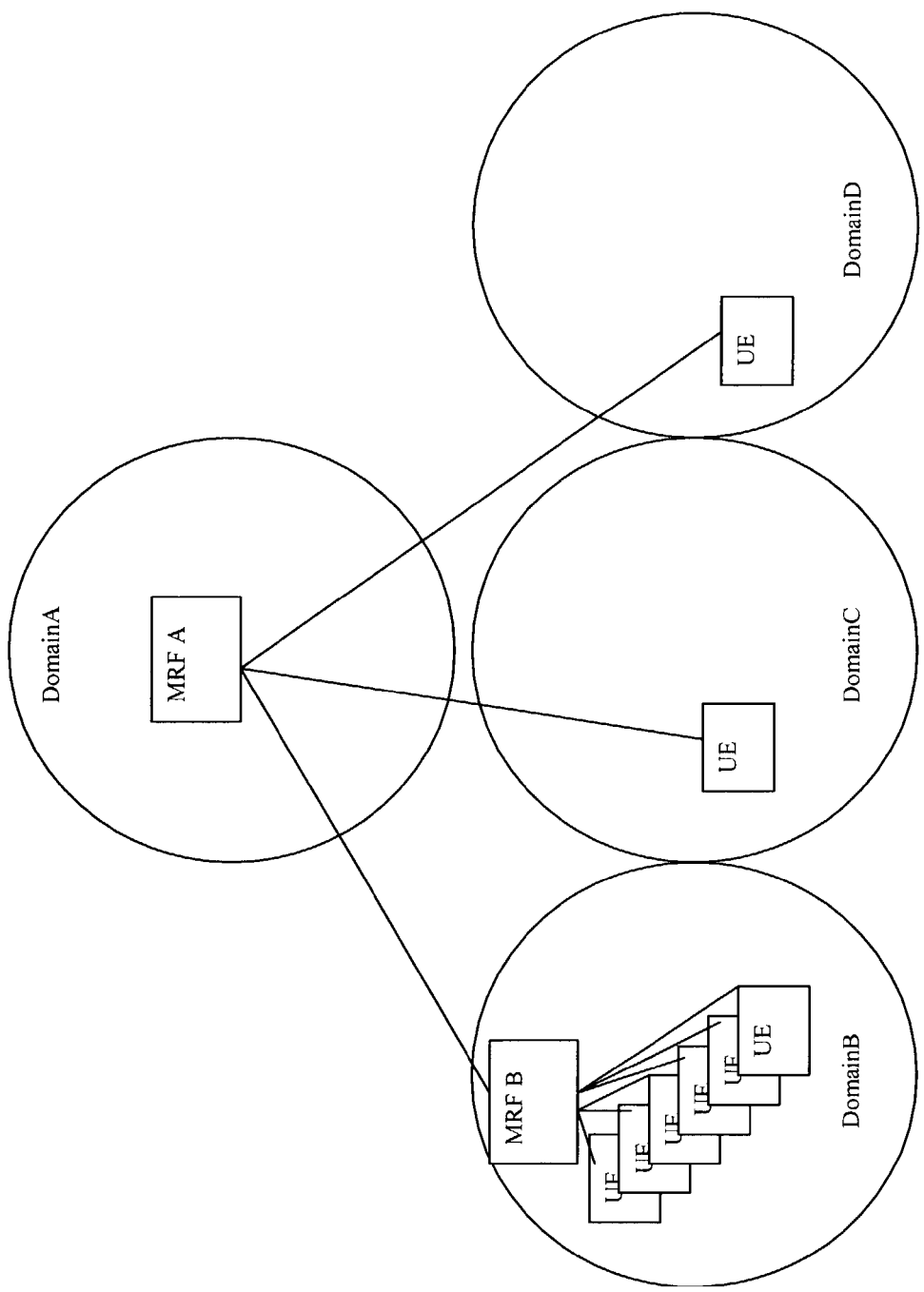
Fig. 3 Situation after involving another MRF

DYNAMIC DISTRIBUTION OF PARTICIPANTS IN A CENTRALIZED TELEPHONE CONFERENCE

CROSS-REFERENCE TO RELATED APPLICATIONS

This application claims priority from Norwegian Application No. 20013497, filed Jul. 13, 2001, the disclosure of which is hereby incorporated herein by reference.

FIELD OF THE INVENTION

The present invention is related to packet switched communication networks, in particular conferencing services to end-users in a third generation network.

BACKGROUND OF THE INVENTION

Conference calls have turned out to be a widely used service, replacing ad hoc meetings between participants separated from each other. Conference calls have been available in circuit switched PSTN networks for a long time, mainly based on speech. However, for a conference call to be a satisfactory substitute to a personal meeting, it has to offer additional multimedia services like video and data streaming. PSTN networks were originally constructed to support speech only, and are therefore not well suited for transferring multimedia services. Thus, IP networks will instead mainly be utilized as bearers of multimedia conferencing in the future.

3GPP [1] is a IP based standard specifying a node called MRF (Media Resource Functions). The task of the MRF is to handle multimedia conferencing between two or more end-points in a packet switched network and i.a. to mix the data streams which belongs to the same conference. Both ad-hoc and scheduled conferences may be set up with the MRF as a centralised conference bridge, mixing the different media streams.

A more general term for MRF is Conference Unit. In this document Conference Unit is referred to as MRF giving a more concrete view of the problems and the corresponding solutions set forth. The aspects are not limited to MRF, but are addressed to any Conference Unit according to the SIP protocol.

There are two main problems with the above mentioned approach of the 3GPP. First, the MRF may run out of resources. This may occur when too many participants are taking part in each conference, and/or when too many conferences are handled simultaneously by the same MRF, leading to an excess of the capacity limit. This may cause in a refusal of additional participants or conferences requesting an overloaded MRF, or the already existing may be damaged through lowered quality or processing speed.

Even if an MRF contains sufficient capacity to handle large conferences, still another problem may occur when transmitting all the associated media streams to one central mixer. This may create a large network load, leading to slow and/or damaged data transmission.

These problems also occur in other SIP [2] networks supporting centralised conferencing using a component similar to the MRF.

Use of a multi-processor system may solve the first problem. This may involve continuous monitoring of the processor load of the MRF, and then simply adding more processor capacity when needed. However, multi-processor systems are very expensive, and will never scale indefinitely.

In addition, all available processor recourses will not be utilized optimally, as large conferences may be accumulated in one MRF leaving another unused. Multi-processor solutions will not solve the transmit and receive problem described in the section above.

Another well-known solution is to arrange MRFs hierarchically in a tree, where the different terminals joining the conference will actually join different MRFs. This is (among other places) described in [3].

Using a pre-defined hierarchy of MRFs is a very static solution, and also requires the endpoints to be configured to use one specific MRF. A dynamic solution is rather to prefer, because the nature of such solutions distributes the transmission of data and execution of tasks on communication links and processor recourses, respectively, in a more optimal manner.

SUMMARY OF THE INVENTION

It is an object of the present invention to provide a method that eliminates the drawbacks described above. The features defined in the independent claim enclosed characterize this method.

More specifically, the present invention provides a method for distributing participants of a conference handled by a first conference unit by, when a first condition is reached, locating a second conference unit satisfying a second condition, reserving conference call capacity in said second conference unit, transferring one or more of said participants from the first to the second conference unit and preferably entering said first conference unit as a participant in said second conference unit, wherein data streams of possible conference participants still attached to the first conference unit are mixed in the first conference unit and communicated as one data stream to the second conference unit.

The invention is particularly useful when applied to the SIP protocol in a 3GPP network.

BRIEF DESCRIPTION OF THE DRAWINGS

FIG. 1 is a block diagram illustrating the situation as it may occur when too many participants are attached to one MRF, and the present invention is not utilized.

FIG. 2 is a flow chart illustrating the data flow when moving participants to another MRF according to the present invention FIG. 3 is a block diagram illustrating the situation as it may occur after the present invention has been utilized.

DETAILED DESCRIPTION OF THE PREFERRED EMBODIMENTS

The present invention will in the following be described in a 3GPP [1] environment, applied to Media Resource Functions(MRF) referring to the above-mentioned figures. However, this does not represent any limitations to the invention. The present invention may be utilized in other similar applications, environments and contexts with other variations and substitutions without departing from the scope of the invention as defined by the attached independent claims.

For illustration purposes, terminology and commands from the SIP protocol will be used in the following.

According to the present invention, the central MRF involves other MRFs when needed based on certain parameters e.g. load and participant location. When a certain condition exist e.g. a threshold is reached, the MRF starts searching for other possible MRFs being able to take over at least a part of the load in a more optimal manner. Thus, a certain second condition has to exist in the new MRF. This may be a certain amount of unoccupied recourses, and/or that the new MRF is in a certain domain. When this new suitable MRF is found, the conference and some or all of the conference participants are moved to this MRF, and the original MRF is assigned as a participant of the transferred conference.

Generally, when involving another MRF, the central MRF must go through the following steps when it has an established conference:

Locate another MRF
Reserve conferencing capacity in the located MRF
Join itself as a participant in the located MRF
Move a number of participants to the new MRF How to solve the two first steps depends on the mechanisms chosen by 3GPP for creating ad-hoc conferences, i.e. conferences being ordered at the time they are about to take place. This has not yet been discussed in 3GPP[1]. One possibility is that there will be a standardised name for ad-hoc conferences followed by the name of the domain the conference server is located in, e.g. adhoc.conference@domain.com. This may be used in a SIP URI in an INVITE command, combining the two first steps above.

Another option is to use SLP (Service Location Protocol), where a client may search for a service in the network, in this case a SIP conference service. By doing this, step 1 consists of a SLP request, and step 2 of a SIP INVITE.

According to the present invention, all is done dynamically. An MRF does not need to have any knowledge of other MRFs by configuration. It will search for an MRF in the domain where it needs it, when it needs it.

An example of an unequal and non-optimal distribution is shown in FIG. 1. Here, six of the participants of a conference contained in MRF A are calling from Domain B even if MRF A is localized in domain B. However, in domain B there is also an MRF (B) which, at present, is provided with unoccupied capacity.

According to the present invention, the MRF A will at a moment, dependent of a certain parameter, search for another suitable MRF. This parameter might i.a. be a threshold for the number of conference participants calling from a foreign domain at the same time. In the situation of FIG. 1, this threshold may have been exceeded.

After searching, MRF A will have detected MRF B as the most suitable MRF to take over the six above-mentioned participants. The MRF A will then move these participants to MRF B in domain B and let MRF B mix the local streams there, and only send the mixed stream to the MRF A for further mixing.

The data flow concerning the transfer of participants is illustrated in FIG. 2. MRF A tries to reserve a conference in domain B by sending a SIP INVITE message with URI indicating a new ad-hoc conference. MRF B has the sufficient capacity and acknowledges the request in a SIP 200 OK. MRF A has now created a conference in MRF B and is the only active participant. MRF A then starts moving participants by first putting them on hold (SIP INVITE hold), then asking MRF B to invite them into the conference (by using SIP REFER) and finally releasing the original sessions with the participants. The situation after this procedure is shown in FIG. 3, wherein now only one media stream is present from domain A to domain B, hence reducing the network load.

Of course, the same solution may be applied when the MRF detects that it can not handle more participants because of overload, except that it in this case it would move some participants to another MRF in the same domain.

It has to be noted that the condition for initiating a complete or partial transfer of participants from one MRF to another is not limited to reaching one single or some certain unchangeable threshold type(s) or value(s). The condition may be selected and tuned by an operator, comprising any combination of threshold types and/or sub conditions respectively associated with any values the operator may find convenient. Thus, the invention provides a flexible way for the operator to optimise, distribute and tune the load of and the data flow between the MRFs. Examples of threshold types other than those suggested above, may be e.g. available bandwidth between MRF and participants, quality of the services involved, costs etc.

A main advantage of the present invention is that it is possible for MRFs to avoid overload situations by sharing the load between several MRFs dynamically based on the parameters the operator chooses (e.g. location and load).

A further advantage is that network load may be reduced so as to avoid that communication links unnecessarily are being overloaded.

Still another advantage of the present invention is that it offers a much cheaper solution compared to a multi-processor system, since the network resources may be better utilised.

Also, the present invention permits cost reductions by means of less data transmission over large distances because, according to the invention, participants calling from a different domain than the MRF to which they are attached, may be transferred to an MRF within their own domain.

ABBREVIATIONS

| SIP | Session Initiation Protocol |
|---|---|
| MRF | Media Resource Function |
| URI | Universal Resource Identifier |
| 3GPP | 3$^{rd}$ Generation Partnership Project |
| PSTN | Public Switched Telecommunication Network |
| IP | Internet Protocol |
| UE | User Equipment |
| SLP | Service Location Protocol |

REFERENCES

[1] 3GPP overall architecture. 3GPP TS 23.228 v. 2.0.0
[2] Session Initiation Protocol—SIP, IETF RFC 2543
[3] European Patent Application EP 0 889 629 A2, "Multi-point-conference connection system"
[4] Service Location Protocol, version 2—SLP, IETF RFC 2608

The invention claimed is:

1. A method of distributing one or more participants of a conference handled by a first conference unit in a packet switched network, the method comprising:
   when a first condition is reached,
   a. locating a second conference unit satisfying a second condition, wherein locating the second conference unit is executed by sending an INVITE message with a Universal Resource Identifier (URI) indicating a new ad-hoc conference to a domain of current interest;

b. reserving conference call capacity in said second conference unit, wherein when the second conference unit is located, the first conference unit starts transferring the one or more participants by:

putting the one or more participants on hold, requesting the second conference unit to invite the one or more participants to the second conference unit, and releasing the one or more participants from the first conference unit:

c. transferring one or more of said participants from the first to the second conference unit, and d. entering said first conference unit as a participant in said second conference unit, wherein the conference units and the participants communicate according to a Session Initiation Protocol (SIP), and data streams of possible conference participants still attached to the first conference unit are mixed in the first conference unit and communicated as one data stream to the second conference unit.

2. The method according to claim 1, wherein the first condition is reached when the number or ratio of the participants localized in a second domain different from a first domain, in which said first conference unit is localized, exceeds a first pre-defined threshold.

3. The method according to claim 2, wherein the second conference unit satisfies the second condition if it is localized in the second domain and has sufficient unoccupied capacity for receiving the one or more of said participants from the first conference unit.

4. The method according to claim 1, wherein the first condition is reached when the number of participants exceeds a second predefined threshold.

5. The method according to claim 4, wherein the second conference unit satisfies the second condition if it is localized in the same domain as the first conference unit and has sufficient unoccupied capacity for receiving one or more of said participants from the first conference unit.

6. The method according to claim 1, wherein the packet switched network is a 3GPP network, and the conference units are Media Resource Function (MRF) units.

* * * * *